(12) United States Patent
Benny et al.

(10) Patent No.: US 9,191,360 B2
(45) Date of Patent: Nov. 17, 2015

(54) ADDRESS MANAGEMENT IN AN OVERLAY NETWORK ENVIRONMENT

(71) Applicant: International Business Machines Corporation, Armonk, NY (US)

(72) Inventors: Stephan Benny, San Jose, CA (US); Amitabha Biswas, San Francisco, CA (US); Jayakrishna Kidambi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 13/747,223

(22) Filed: Jan. 22, 2013

(65) Prior Publication Data

US 2014/0207969 A1 Jul. 24, 2014

(51) Int. Cl.
*G06F 15/16* (2006.01)
*H04L 29/12* (2006.01)
*H04L 12/24* (2006.01)
*H04L 12/715* (2013.01)

(52) U.S. Cl.
CPC ........ *H04L 61/2046* (2013.01); *H04L 41/0803* (2013.01); *H04L 61/2535* (2013.01); *H04L 45/64* (2013.01); *H04L 61/2007* (2013.01)

(58) Field of Classification Search
CPC . H04L 61/25; H04L 61/2521; H04L 61/2535; H04L 61/2546
USPC ........................................................ 709/245
See application file for complete search history.

(56) References Cited

U.S. PATENT DOCUMENTS

| 7,953,865 | B1* | 5/2011 | Miller et al. ................... 709/227 |
| 8,239,572 | B1 | 8/2012 | Brandwine et al. |
| 8,396,946 | B1* | 3/2013 | Brandwine et al. ........... 709/220 |
| 8,560,646 | B1* | 10/2013 | Sivasubramanian et al. . 709/220 |
| 8,719,914 | B2* | 5/2014 | Edwards et al. ................ 726/12 |
| 8,725,898 | B1* | 5/2014 | Vincent ......................... 709/245 |
| 2002/0065806 | A1* | 5/2002 | Kim ................................. 707/1 |
| 2011/0110377 | A1* | 5/2011 | Alkhatib et al. ......... 370/395.53 |
| 2011/0320821 | A1* | 12/2011 | Alkhatib et al. .............. 713/176 |

FOREIGN PATENT DOCUMENTS

JP 2008154066 A 7/2008

OTHER PUBLICATIONS

Durairaj, R. et al., "Multi-Tenancy Isolation in Datacenter Networks", Oct. 25, 2011, pp. 1-13, Cisco Systems, Inc., USA.
Mell, P. et al., "The NIST Definition of Cloud Computing", Special Publication, Version 15, Oct. 7, 2009, 2 pages, National Institute of Standards and Technology, Information Technology Laboratory, USA.
International Search Report and Written Opinion dated Apr. 8, 2014 for International PCT Application No. PCT/IB2013/059653 from International Searching Authority, Japan Patent Office, pp. 1-8, Tokyo, Japan.

\* cited by examiner

*Primary Examiner* — Duyen Doan
(74) *Attorney, Agent, or Firm* — Sherman IP LLP; Kenneth L. Sherman; Hemavathy Perumal

(57) ABSTRACT

Embodiments of the invention relate to overlay network address management. One embodiment includes an overlay gateway including an overlay network manager associated with a physical network. The overlay network manager prevents duplicate address assignment for overlay domains having a first sharing status and performs address translation for overlay domains having a second sharing status. Address translation is avoided for overlay domains having the first sharing status.

25 Claims, 5 Drawing Sheets

| Domain | Address space | Shared |
|---|---|---|
| D1 | 192.168.1.0/24 | Yes |
| D2 | 192.168.1.0/24 | No |
| D3 | 192.168.1.0/24 | Yes |

ADDRESS MANAGEMENT IN AN OVERLAY NETWORK ENVIRONMENT

BACKGROUND

Embodiments of the invention relate to overlay networks and in particular, address management in an overlay network environment.

A physical network is shared among different tenants by creating virtual overlay networks on top of the physical network. Virtual overlay networks help to isolate a tenant network in a shared infrastructure. An overlay network is emulated by encapsulating tenant traffic in overlay headers.

BRIEF SUMMARY

Embodiments of the invention relate to overlay network address management. One embodiment includes an overlay gateway including an overlay network manager associated with a physical network. The overlay network manager prevents duplicate address assignment for overlay domains having a first sharing status and performs address translation for overlay domains having a second sharing status. Address translation is avoided for overlay domains having the first sharing status.

Another embodiment comprises an overlay network system. The overlay network system comprises a physical network. A network manager is coupled to the physical network. The network manager creates one or more networks overlaying the physical network. An overlay domain administrator module assigns a set of address spaces for each overlay domain. The set of address spaces each includes an address sharing status indication. An overlay network manager prevents duplicate address assignment for overlay domains having a first sharing status and performs address translation for overlay domains having a second sharing status. Address translation is avoided for overlay domains having the first sharing status.

One embodiment comprises a method including creating a plurality of overlay domains each associated with an underlying physical network. A set of address spaces is assigned for each overlay domain. The set of address spaces each includes an address sharing status indication. Duplicate address assignment is prevented for overlay domains having a first sharing status. Address translation is performed for overlay domains having a second sharing status. Address translation is avoided for overlay domains having the first sharing status.

Another embodiment comprises a non-transitory computer-useable storage medium for managing addresses in an overlay network. The computer-useable storage medium having a computer-readable program. The program upon being processed on a computer causes the computer to implement: creating a plurality of overlay domains associated with an underlying physical network, assigning a set of address spaces for each overlay domain, wherein the set of address spaces each include an address sharing status indication, preventing duplicate address assignment for overlay domains having a first sharing status, and performing address translation for overlay domains having a second sharing status, wherein address translation is avoided for overlay domains having the first sharing status.

These and other features, aspects and advantages of the present invention will become understood with reference to the following description, appended claims and accompanying figures.

DETAILED DESCRIPTION

Figure 1:
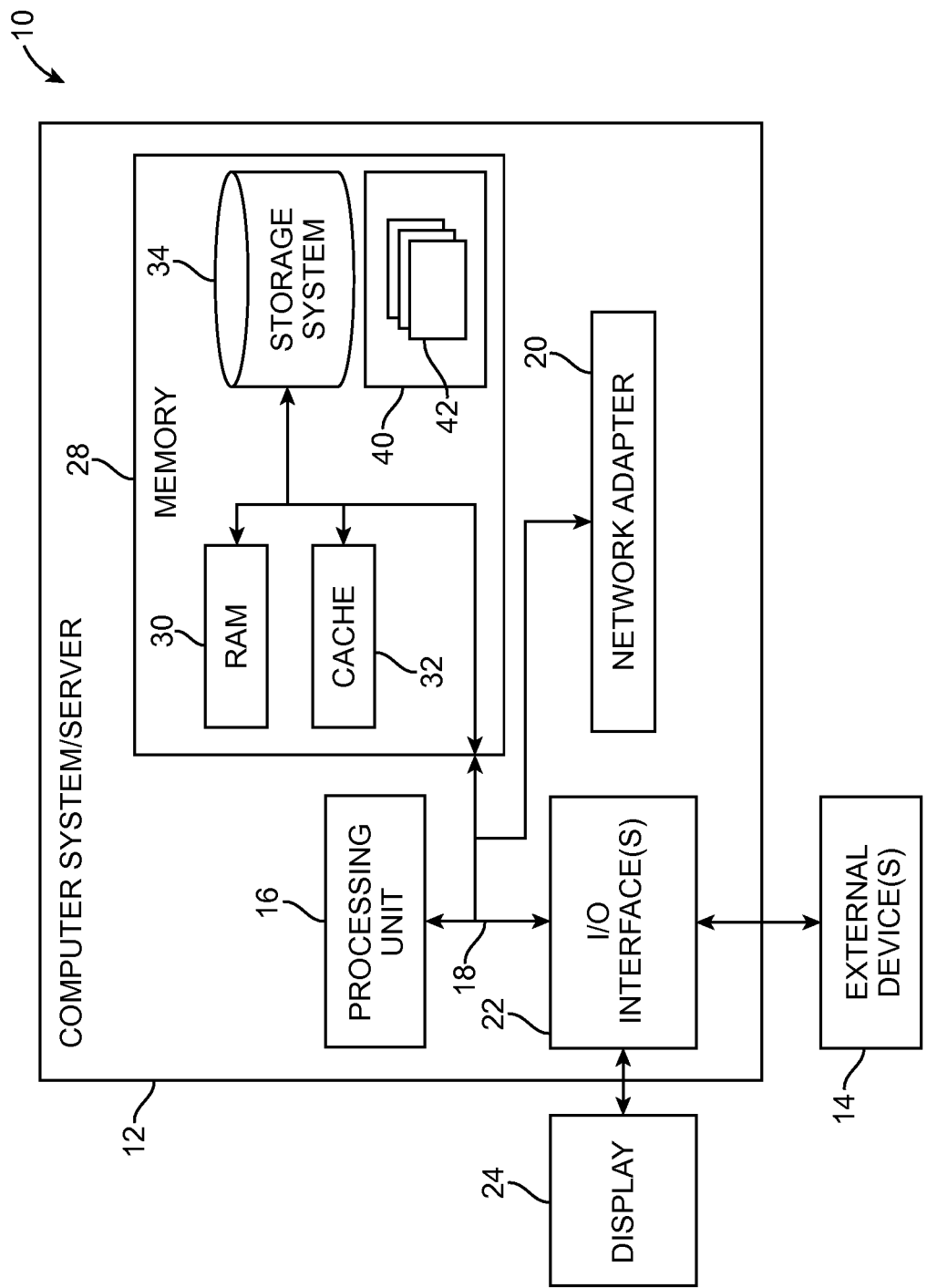
FIG. 1 depicts a cloud computing node according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
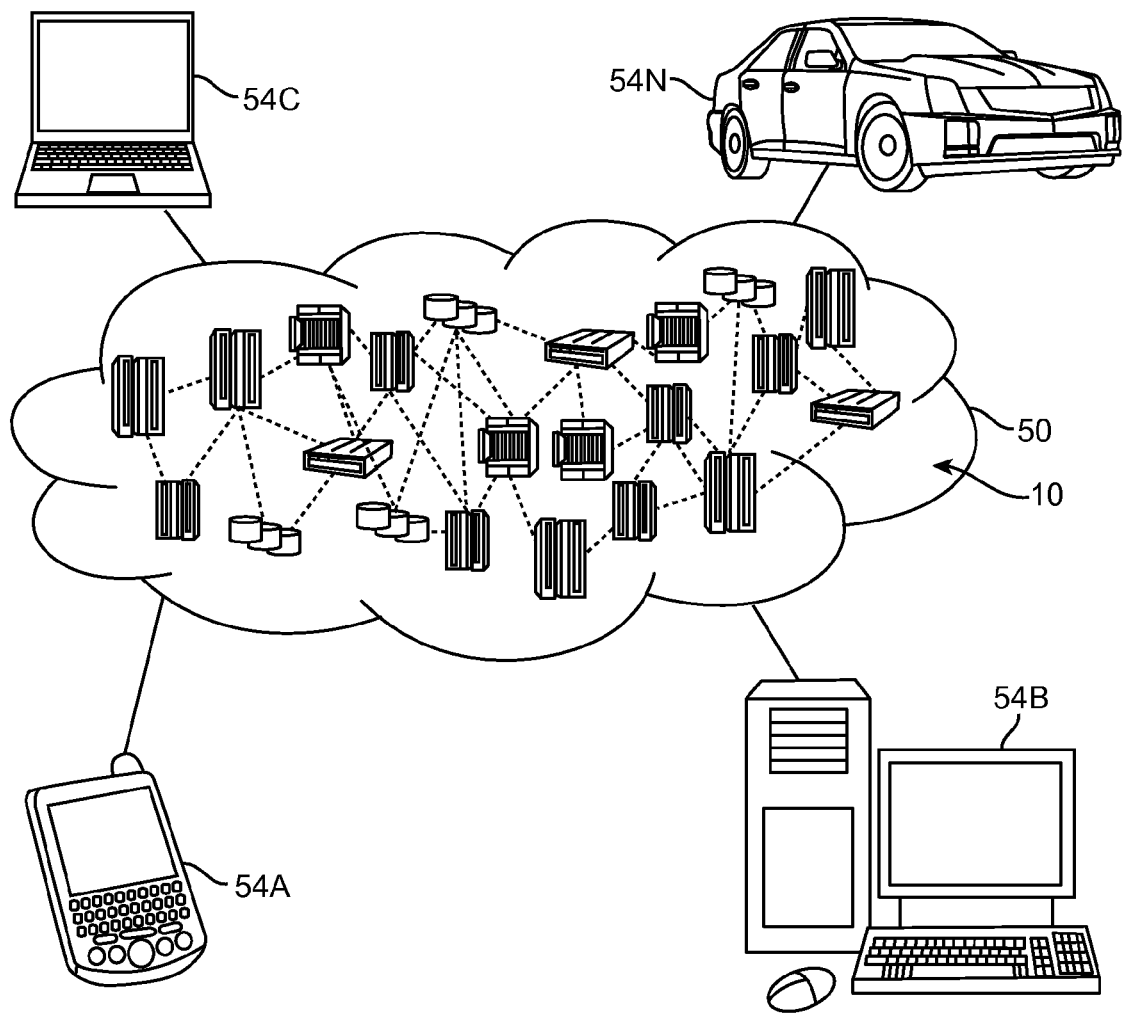
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
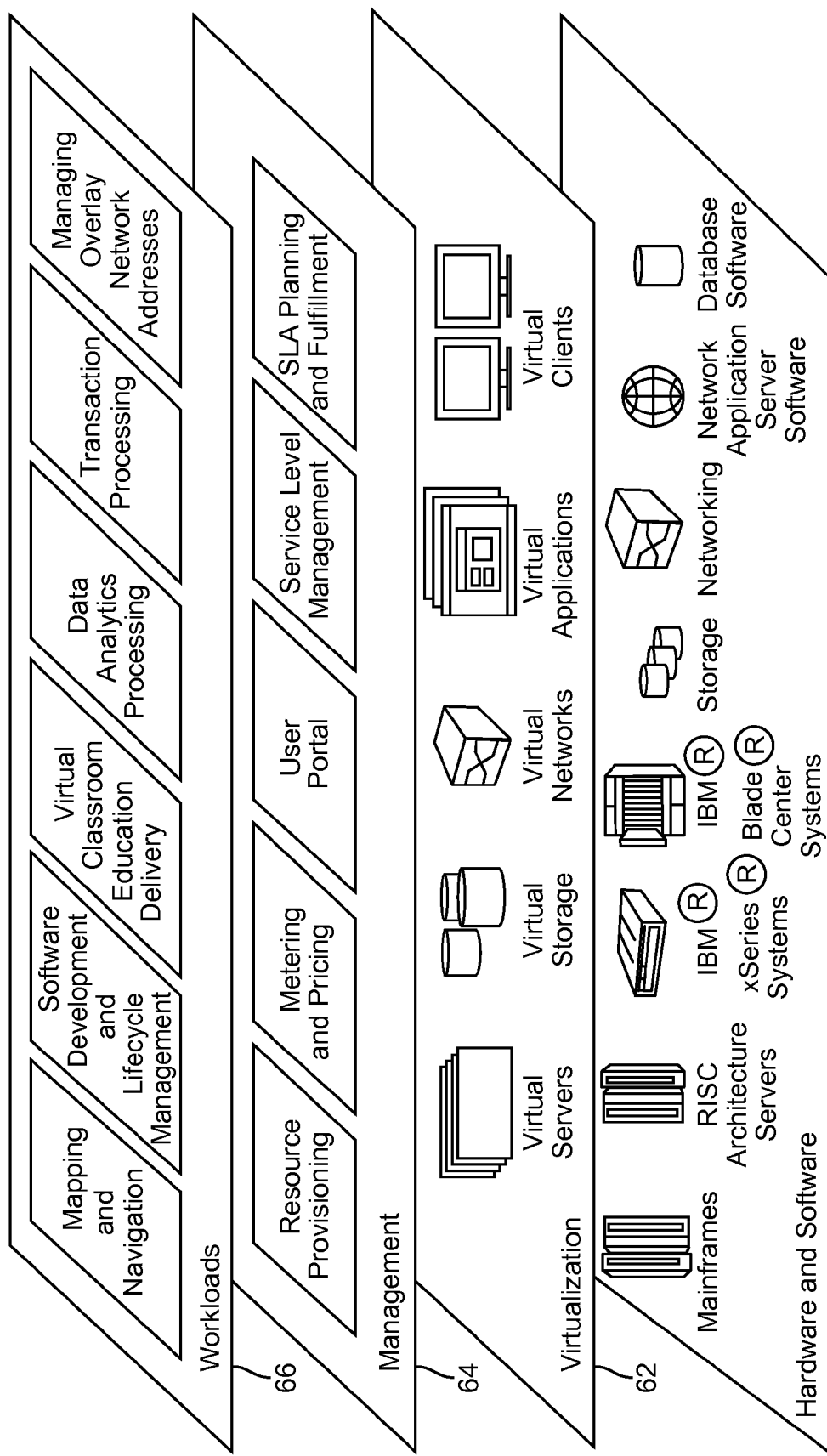
FIG. 3 depicts an abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing overlay network addresses. As mentioned above, all of the foregoing examples described with respect to FIG. 3 are illustrative only, and the invention is not limited to these examples.

It is understood all functions of the present invention as described herein are typically performed by the virtual overlay network system 400, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

According to an embodiment of the invention, an overlay gateway includes an overlay network manager associated with a physical network. The overlay network manager prevents duplicate address assignment for overlay domains having a first sharing status and performs address translation for overlay domains having a second sharing status. Address translation is avoided for overlay domains having the first sharing status.

Figures 4, 5:
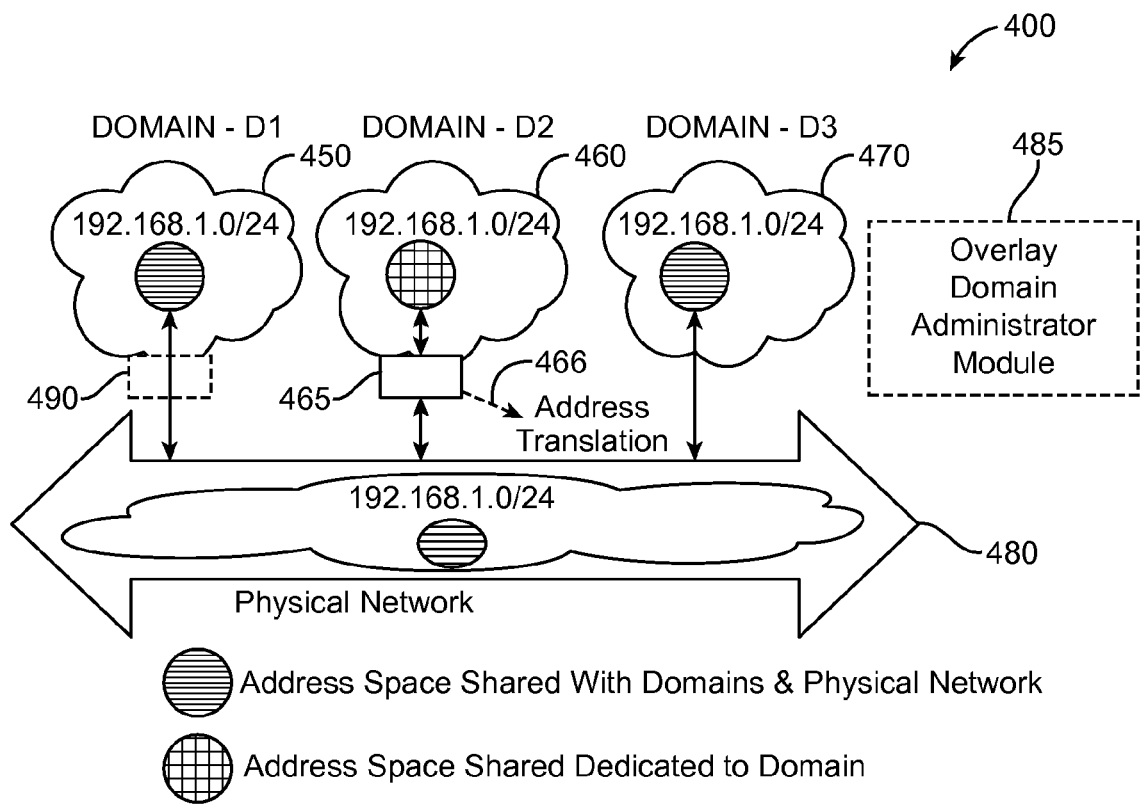
FIG. 4 illustrates overlay networks employing an embodiment of the present invention.
FIG. 5 illustrates a table for managing addresses in an overlay network, in accordance with an embodiment of the invention.

FIG. 4 illustrates overlay networks 450, 460, and 470 employing an embodiment of the present invention in a virtual overlay network system 400. In one embodiment, the virtual overlay network system 400 includes a physical network 480 and one or more virtual overlay networks, such as overlay networks 450, 460, and 470. In one example, the physical network 480 may include one or more computing nodes (e.g., cloud computing node 10), one or more computing environments (e.g., cloud computing environment 50), a data center, etc.

Overlay networks may solve scaling issues and provide flexibility in managing addresses by separating each overlay network into isolated domains. Addresses may be reused in different domains and a tenant is typically free to assign any address in its domain. Gateway services are required when an entity in a domain wants to communicate outside of the domain. Typical gateways provide this connectivity by encapsulation, de-encapsulation and complex address-translations. Typical overlay networks require address-translation services to cross an overlay domain boundary. In one embodiment, a gateway 465 includes an overlay network manager 466 that provides address translation services only upon domain boundary crossing. In this embodiment, the overlay network manager 466 optimizes the address translation services so that address translation is required only when necessary, which improves performance and reduces administration effort.

In one embodiment, the overlay network manager 466 uses a "shared-address space" scheme in which an overlay-domain entity (e.g., a virtual machine (VM)) shares address space with the physical network 480 so that when an overlay-domain entity communicates with the physical network 480 there is no need to translate the addresses. In on example, a gateway 490 is only required to perform encapsulation and de-encapsulation. In one embodiment, while creating an overlay domain (e.g., 450, 460 and 470), an administrator or optional overlay domain administrator module 485 assigns a set of "address spaces" that are allowed in that domain.

In one embodiment, each of the allowed address space includes a shared address space property status for indicating whether the address space is shared with the physical network 480 or not. In one example, when an address space is shared, the overlay network manager 466 will prevent any duplicate address assignment in the domain. If a tenant assigns an address (in the shared space) that is already assigned in the physical network 480, the overlay network manager 466 will detect the duplicate entry and will deny the new assignment.

In one example, when the shared address space property status is set to shared (indicating that the address space is a shared address space), the overlay network manager 466 determines whether any conflicts of addresses amongst the domains that share the address space. A unique problem may exist in data distribution if the overlay network manager 460 is deployed as a cluster of individual overlay network managers, where each individual overlay network manager maintains discrete sets of data. Conflicts must be detected quickly within the cluster with minimal number of hops within the cluster. In one embodiment, the overlay network manager 466 detects conflicts within the shared address space and detects location within the shared address space in at most two (2) hops within the cluster.

In one example, the overlay network manager 466 is dedicated to the shared address space on the gateway 465. The overlay network manager 466 joins the cluster of network managers when the gateway 465 becomes active on the network (e.g., overlay network 460) and disappears when the gateway 465 is removed from the network. The overlay network manager 466 only manages the addresses that belong to the assigned shared address space.

In one embodiment, a table is used by the overlay network manager 466 for storing the shared property status. FIG. 5 shows a table 500 for managing addresses in an overlay network (e.g., 450, 460 and 470) in accordance with an embodiment of the invention. In one embodiment, the table 500 includes a domain field 510, an address space field 520 and a shared address space status field 530.

In one example, the domain field includes an identification (ID) for a domain. The address space field 520 includes the address space for addresses of domains that may be shared or not. In one example, the shared address space status field 530 includes an indication (e.g., Yes/No, True/False, etc.) for indicating whether the address space is shared or not for the associated domain.

The following example illustrates of an embodiment using the overlay network manager 466 with table 500. An address space (e.g., address space A=192.168.1.0/24) is shared in domain D1 that is associated with the virtual overlay network 450, and is not shared in another domain D2 associated with virtual overlay network 460. In one example, domain D1 has an example shared address space status field 530 set to "Yes," and domain D2 has an example shared address space status field 530 set to "No." In this example, when the VMs in domain D1 communicate to the physical network 480, there is no need to perform address translation by the gateway, such as gateway 490. In this example, domain D1 does not have full control on address assignment since the overlay network manager 466 will detect duplicate assignments if any.

For domain D1, complex translation services are avoided. In domain D2, the address space A is completely available to the tenant and the tenant can freely assign addresses without worrying about any conflicts with the physical network 480, but address translation is required to cross the domain boundary. In one example, the overlay network manager 466 provides an additional level of flexibility to choose what kind of address scheme to be used in an overlay network environment.

In the example above, domain D3 (associated with virtual overlay network 470) and D1 share the address space A with the physical network 480. In this example, domain D3 has an example shared address space status field 530 set to "Yes." Therefore, all of the addresses in address space A are not exclusively available to domains D1 and D3. The overlay network manager 466 validates duplicate addresses among domains D1 and D3, and the physical-network 480. There is no requirement, however, for any address translations when D1 or D3 communicates to a physical network 480 entity.

Figure 6:
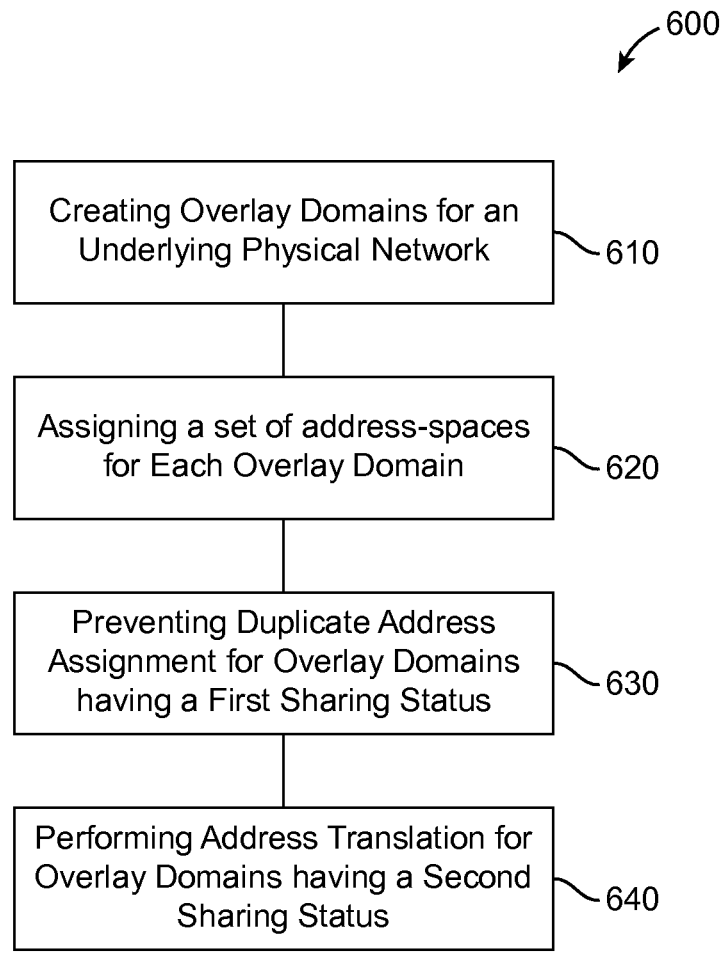
FIG. 6 is a flowchart showing a process for address management in an overlay network, in accordance with an embodiment of the invention.

FIG. 6 illustrates a flowchart of an example process 600 for address management in a virtual overlay network system (e.g., the virtual overlay network system 400), according to one embodiment. In process block 610, overlay domains (e.g., domains D1, D2 and D3) are created for an underlying physical network (e.g., physical network 480). In process block 620, a set of address spaces for each overlay domain are assigned. In process block 630, duplicate address assignment is prevented by an overlay network manager (e.g., overlay network manager 466) of a gateway (e.g., gateway 465) for overlay domains having a first address space sharing status (e.g., a shared address space status field 530 is set to "Yes"). In one example, the first address space sharing status indicates address space sharing with the underlying physical network. In process block 640, address translation is performed by an overlay network manager (e.g., overlay network manager 466) for overlay domains having a second sharing status (e.g., a shared address space status field 530 is set to "No").

In one example, the second sharing status indicates no address space sharing with the underlying physical network. In one example, the overlay network manager module for the particular overlay domain is activated with a cluster of overlay network manager modules upon a gateway associated with the particular overlay domain being activated and is deactivated upon the gateway being deactivated.

In one embodiment, the process 600 further includes generating an address space table (e.g., table 500) comprising fields for overlay domain, address space, and address sharing type indication. In one example, VMs of a first overlay domain having the first sharing status communicate with the physical network without requiring address translation. In one embodiment, overlay domains having the first sharing status cannot duplicate address assignments, and overlay domains having the second sharing status have control for duplicating address assignments.

The system 400 may include one or more source programs, executable programs (object code), scripts, or any other entity comprising a set of computer program instructions to be performed. When the system 400 includes a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In one embodiment, where the system 400 is implemented in hardware, the system 500 can be implemented with any one or a combination of the following technologies, which are each well known in the art: a discrete logic circuits) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system comprising a computer processor, a computer-readable hardware storage device, and program code embodied with the computer-readable hardware storage device for execution by the computer processor to implement a method comprising:
    creating a plurality of overlay domains, wherein each overlay domain is associated with a different overlay network of a plurality of virtual overlay networks overlaying a physical network, and wherein each overlay domain is assigned a corresponding address space that includes information identifying a sharing status of the address space;
    preventing duplicate address assignment for a first overlay domain of the plurality of overlay domains, wherein the first overlay domain is assigned a corresponding address space having a first sharing status, and wherein the first sharing status indicates that the corresponding address space assigned to the first overlay domain is shared with the physical network, and addresses of the corresponding address space assigned to the first overlay domain are not exclusively available to the first overlay domain; and
    performing address translation for a second overlay domain of the plurality of overlay domains, wherein the second overlay domain is assigned a corresponding address space having a second sharing status, and wherein the second sharing status indicates that the corresponding address space assigned to the second overlay domain is dedicated to the second overlay domain, and addresses of the corresponding address space assigned to the second overlay domain are exclusively available to the second overlay domain;
    wherein a virtual machine of the first overlay domain assigned a corresponding address space having the first sharing status communicates with the physical network without requiring address translation.

2. The system of claim 1, the method further comprising:
    utilizing an address space table for managing addresses of a particular address space, wherein the address space table maintains information indicating, for each overlay domain of the plurality of overlay domains, whether the particular address space is shared for the overlay domain.

3. The system of claim 2, wherein the particular address space has the first sharing status indicating that the particular address space is shared with the physical network.

4. The system of claim 3, wherein:
    an overlay network manager is dedicated to the particular address space;
    the overlay network manager joins a cluster of network managers in response to a gateway being activated; and
    the overlay network manager is deactivated in response to the gateway being deactivated.

5. The system of claim 1, wherein:
    the first overlay domain assigned a corresponding address space having the first sharing status cannot duplicate address assignments; and
    the second overlay domain assigned a corresponding address space having the second sharing status has control for duplicating address assignments.

6. A system comprising a computer processor, a computer-readable hardware storage device, and program code embodied with the computer-readable hardware storage device for execution by the computer processor to implement a method comprising:
    assigning, to each overlay domain of a plurality of overlay domains, a corresponding address space that includes information identifying a sharing status of the address space;
    wherein each overlay domain of the plurality of overlay domains is associated with a different one of a plurality of virtual overlay networks overlaying a physical network;
    wherein, for a first overlay domain associated with one of the plurality of virtual overlay networks assigned a corresponding address space having a first sharing status, the first sharing status indicates that the corresponding address space assigned to the first overlay domain is shared with the physical network, and that addresses of the corresponding address space assigned to the first overlay domain are not exclusively available to the first overlay domain, such that duplicate address assignments for the first overlay domain are not allowed; and
    wherein, for a second overlay domain associated with one of the plurality of virtual overlay networks assigned a corresponding address space having a second sharing status, the second sharing status indicates that the corresponding address space assigned to the second overlay domain is dedicated to the second overlay domain, and that addresses of the corresponding address space assigned to the second overlay domain are exclusively available to the second overlay domain, such that address translation for the second overlay domain is required.

7. The system of claim 6, wherein a virtual machine of the first overlay domain assigned a corresponding address space having the first sharing status communicates with the physical network without requiring address translation.

8. The system of claim 6, the method further comprising:
generating an address space table for managing addresses of a particular address space, wherein the address space table maintains information indicating, for each overlay domain of the plurality of overlay domains, whether the particular address space is shared for the overlay domain.

9. The system of claim 8, wherein the particular address space has the first sharing status indicating that the particular address space is shared with the physical network.

10. The system of claim 6, wherein the first overlay domain assigned a corresponding address space having the first sharing status cannot duplicate address assignments.

11. The system of claim 6, wherein the second overlay domain assigned a corresponding address space having the second sharing status has control for duplicating address assignments.

12. A method comprising:
creating a plurality of overlay domains, wherein each overlay domain is associated with a different overlay network of a plurality of virtual overlay networks overlaying a physical network, and wherein each overlay domain is assigned a corresponding address space that includes information identifying a sharing status of the address space;
preventing duplicate address assignment for a first overlay domain of the plurality of overlay domains, wherein the first overlay domain is assigned a corresponding address space having a first sharing status, and wherein the first sharing status indicates that the corresponding address space assigned to the first overlay domain is shared with the physical network, and addresses of the corresponding address space assigned to the first overlay domain are not exclusively available to the first overlay domain; and
performing address translation for a second overlay domain of the plurality of overlay domains, wherein the second overlay domain is assigned a corresponding address space having a second sharing status, and wherein the second sharing status indicates that the corresponding address space assigned to the second overlay domain is dedicated to the second overlay domain, and addresses of the corresponding address space assigned to the second overlay domain are exclusively available to the second overlay domain.

13. The method of claim 12, wherein a virtual machine of the first overlay domain assigned a corresponding address space having the first sharing status communicates with the physical network without requiring address translation.

14. The method of claim 12, further comprising:
utilizing an address space table for managing addresses of a particular address space, wherein the address space table maintains information indicating, for each overlay domain of the plurality of overlay domains, whether the particular address space is shared for the overlay domain.

15. The method of claim 12, wherein address translation is required for the second overlay domain assigned a corresponding address space having the second sharing status in response to crossing domain boundaries.

16. The method of claim 14, wherein the particular address space has the first sharing status indicating that the particular address space is shared with the physical network.

17. The method of claim 16, wherein:
an overlay network manager is dedicated to the particular address space;
the overlay network manager joins a cluster of network managers in response to a gateway being activated; and
the overlay network manager is deactivated in response to the gateway being deactivated.

18. The method of claim 12, wherein the first overlay domain assigned a corresponding address space having the first sharing status cannot duplicate address assignments.

19. The method of claim 12, wherein the second overlay domain assigned a corresponding address space having the second sharing status has control for duplicating address assignments.

20. A computer program product comprising a computer-readable hardware storage device having program code embodied therewith, the program code being executable by a computer to implement a method comprising:
creating a plurality of overlay domains, wherein each overlay domain is associated with a different overlay network of a plurality of virtual overlay networks overlaying a physical network, and wherein each overlay domain is assigned a corresponding address space that includes information identifying a sharing status of the address space;
preventing duplicate address assignment for a first overlay domain of the plurality of overlay domains, wherein the first overlay domain is assigned a corresponding address space having a first sharing status, and wherein the first sharing status indicates that the corresponding address space assigned to the first overlay domain is shared with the physical network, and addresses of the corresponding address space assigned to the first overlay domain are not exclusively available to the first overlay domain; and
performing address translation for a second overlay domain of the plurality of overlay domains, wherein the second overlay domain is assigned a corresponding address space having a second sharing status, and wherein the second sharing status indicates that the corresponding address space assigned to the second overlay domain is dedicated to the second overlay domain, and addresses of the corresponding address space assigned to the second overlay domain are exclusively available to the second overlay domain.

21. The program product of claim 20, wherein a virtual machine of the first overlay domain assigned a corresponding address space having the first sharing status communicates with the physical network without requiring address translation.

22. The program product of claim 20, the method further comprising:
utilizing an address space table for managing addresses of a particular address space, wherein the address space table maintains information indicating, for each overlay domain of the plurality of overlay domains, whether the particular address space is shared for the overlay domain.

23. The program product of claim 20, wherein address translation is required for the second overlay domain assigned a corresponding address space having the second sharing status in response to crossing domain boundaries.

24. The program product of claim 22, wherein:
the particular address space has the first sharing status indicating that the particular address space is shared with the physical network;

an overlay network manager is dedicated to the particular address space;

the overlay network manager joins a cluster of network managers in response to a gateway being activated; and the overlay network manager is deactivated in response to the gateway being deactivated.

25. The program product of claim 20, wherein:

the first overlay domain assigned a corresponding address space having the first sharing status cannot duplicate address assignments; and the second overlay domain assigned a corresponding address space having the second sharing status has control for duplicating address assignments.

\* \* \* \* \*